United States Patent [19]

Gyugyi

[11] Patent Number: 4,470,005
[45] Date of Patent: Sep. 4, 1984

[54] STATIC VAR GENERATOR HAVING A THYRISTOR CIRCUIT ARRANGEMENT PROVIDING REDUCED LOSSES

[75] Inventor: Laszlo Gyugyi, Penn Hills, Pa.

[73] Assignee: Westinghouse Electric Corp., Pittsburgh, Pa.

[21] Appl. No.: 438,431

[22] Filed: Nov. 2, 1982

[51] Int. Cl.³ .............................................. H02J 3/18
[52] U.S. Cl. .................................... 323/210; 361/13; 363/68
[58] Field of Search ...................... 363/51, 54, 57, 68; 307/252 L, 252 Q; 361/6, 13; 323/210, 211

[56] References Cited

U.S. PATENT DOCUMENTS

| | | | |
|---|---|---|---|
| 3,947,726 | 3/1976 | De Cello et al. | 363/51 |
| 4,234,843 | 11/1980 | Gyugyi et al. | 323/119 |
| 4,274,135 | 6/1981 | Rosa et al. | 363/68 |
| 4,292,545 | 9/1981 | Hingorani | 323/210 |
| 4,307,331 | 12/1981 | Gyugyi | 323/210 |

FOREIGN PATENT DOCUMENTS 743110 6/1980 U.S.S.R. .............................. 363/51

Primary Examiner—William H. Beha, Jr.
Attorney, Agent, or Firm—Benjamin Hudson, Jr.

[57] ABSTRACT

An auxiliary thyristor control circuit inserts a zinc oxide varistor in series with the capacitor bank of a static VAR generator for discharging the capacitor bank when the static VAR generator is subjected to high transient voltages.

2 Claims, 5 Drawing Figures

STATIC VAR GENERATOR HAVING A THYRISTOR CIRCUIT ARRANGEMENT PROVIDING REDUCED LOSSES

BACKGROUND OF THE INVENTION

This invention relates generally to static VAR generators and more particularly to static VAR generators using bi-directional thyristor switches for switching capacitors.

DESCRIPTION OF THE PRIOR ART

In prior art static VAR generators a number of N-capacitor banks, each in series with a bi-directional thyristor switch and sometimes a surge current limiting inductor are employed. Each thyristor circuit, generally consist of a string of back-to-back anti-parallel connected devices to provide sufficient voltage blocking capability. The number of devices in series may be as many as forty (40) or more. The thyristor switches are normally fired in a response to a VAR demand signal at the time instant when the capacitor voltage and the AC supply voltage are equal, thus the voltage across the thyristor switches is zero. The disconnection of capacitor banks, may take place at the instant when voltage across the capacitor bank is equal to the peak of the AC network supply voltage. Thus, the disconnected capacitor banks remain charged to the peak voltage. Since the capacitor bank remains charged to the peak of the AC voltage applied, the thyristor switch has to be rated sufficiently to block twice this voltage. This occurs because the voltage across the thyristor switch is the sum of the applied AC voltage and the capacitor voltage, which reaches a maximum value of twice the peak AC voltage once each cycle when the AC supply voltage reverses.

In the state-of-the-art solid state capacitor switching arrangements, a thyristor switch has to be rated about twice the voltage encountered in the AC network system. Because of overvoltage conditions in the AC network system, this means that the number of thyristors used in a thyristor switching circuit is about twice as many as would be required under normal operating conditions. Since the thyristors are not perfect switches, the losses in the circuit are increased by increasing the number of thyristors employed. In the case of the presently available large thyristors, the continuous current rating of a thyristor switch is in the order of 2000 amperes. This means that when the capacitor bank is switched in, in each thyristor location a power of about 3 kilowatts may be dissipated as a loss. In a large VAR generator of about 300 MVA used typically for a transmission line compensation there may be as many as 360 thyristor locations with a total dissipated loss of about 1,080 kilowatts. Clearly, there is considerable economic incentive to minimize the losses in thyristor switch arrangements.

SUMMARY OF THE INVENTION

There is provided by this invention a thyristor switch arrangement proposed for capacitor switching that aproximately decreases the thyristor switch losses by 50 percent. This novel thyristor switch circuit is comprised generally of a main thyristor switch connected to a capacitor bank for switching into an AC network and responds to a gating signal generated by a VAR generated control circuit. An auxiliary thyristor switch connects a voltage clamping device in parallel with the main thyristor switch whenever the voltage across the main thyristor switch exceeds a predetermined value.

DESCRIPTION OF THE PREFERRED EMBODIMENT

Figure 1:
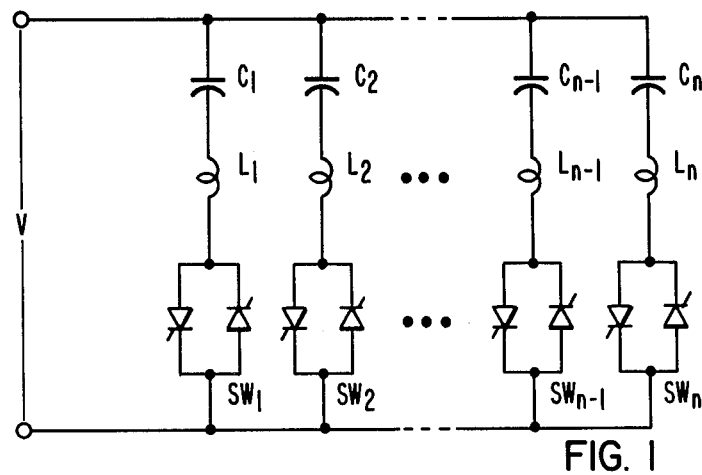
FIG. 1 illustrates a typical prior art static VAR generator.
Figure 2:
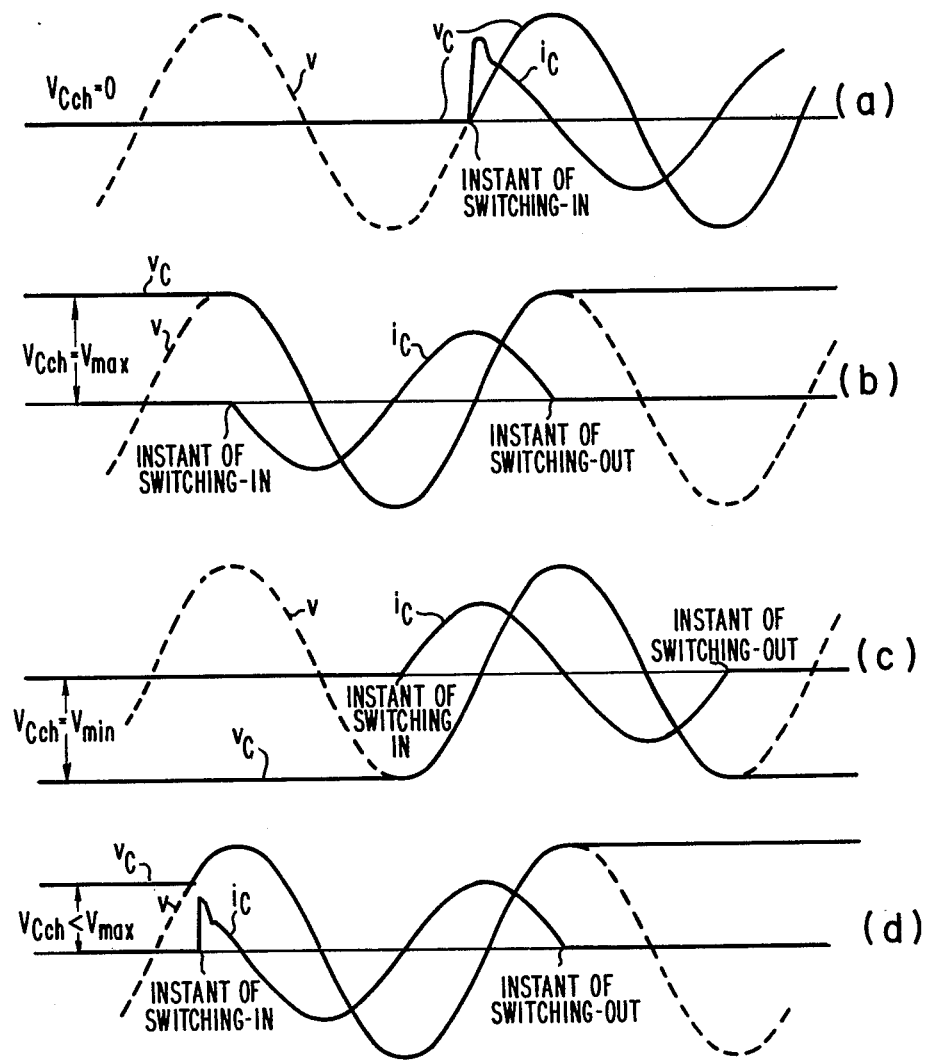
FIG. 2 illustrates voltage and current waveforms characterizing the switching of a capacitor bank in an AC network.

Referring to FIG. 1 there is shown a typical prior art static VAR generator employing anti-parallel thyristors for switching a capacitor and surge current limiting inductor into an AC network. Each thyristor switch SW may in practice consist of several back-to-back connected devices to provide sufficient voltage blocking capability. The thyristor switches are normally fired in response to a VAR demand control circuit (not shown) at the time instant when the capacitor voltage and the AC network supply voltage are equal, thus the voltage across the thyristor switches is zero. FIG. 2 illustrates voltage and current characteristics associated with the switching in and switching out of the capacitor banks in the AC network. As can be seen in FIG. 2a, if uncharged capacitor banks are switched in when the network voltage is going through its zero crossover, a high transient charging current is initiated in the capacitor bank thus creating disturbances in the AC system. FIGS. 2b and 2c illustrate the switching of a charged capacitor bank synchronized with the AC network voltage thus eliminating capacitor surge currents and transients when the capacitor banks are switched in or switched out of an AC network. FIG. 2d illustrates the switching characteristics for a partially charged capacitor. Under some conditions of the AC network the AC terminal voltage may transiently increase well above its nominal crest value charging the connective capacitor banks to high voltage levels. When the capacitor banks are disconnected under these overvoltage conditions the thyristor switches are exposed to high peak voltages during the next half cycle when the AC voltage reverses. This means that a thyristor switch has to be rated for about twice the voltage encountered in normal operation. Consequently the losses normally associated with thyristor circuits are increased because the number of thyristors are increased to accommodate the high transient voltage conditions. In the case of presently available large thyristors, the continuous current rating of a thyristor switch is in the order of 2000 amperes. This means that when the capacitor bank is switched in each thyristor location has a power loss of about 3 kilowatts. In a large VAR generator of about 300 MFA, used typically for transmission line compensation, there may be as many as 360 thyristor locations with a total dissipated loss of about 1080 kilowatts.

Figure 3:
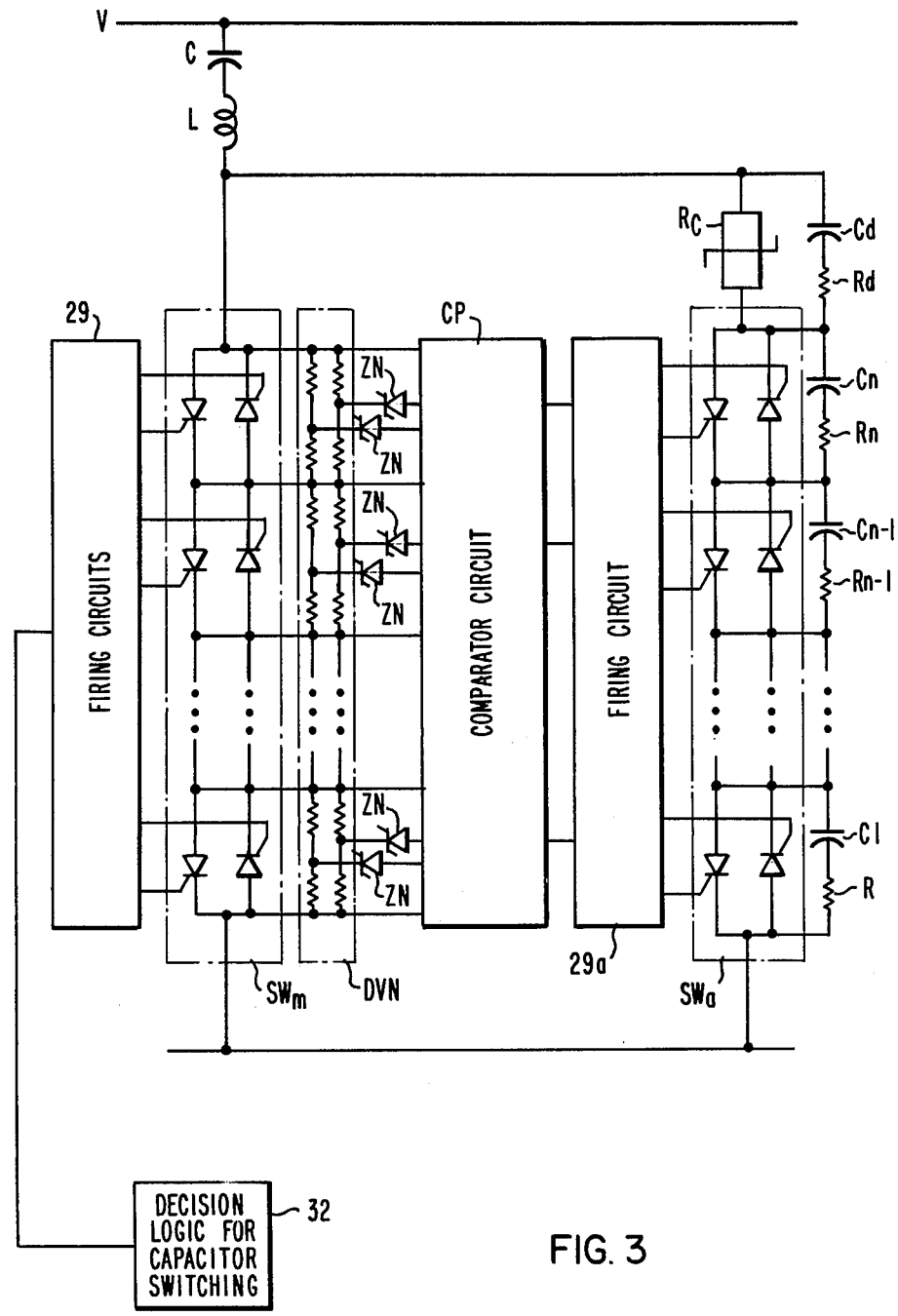
FIG. 3 illustrates a thyristor switch circuit incorporating the principles of this invention.

Shown in FIG. 3 there is provided a thyristor switch arrangement proposed for a capacitor switching that approximately halves the thyristor switch losses. Also as will be seen, the proposed arrangement reduces the cost of overall thyristor switch by reducing the number of thyristors needed. This thyristor switching circuit consists generally of a main thyristor switch $SW_m$ to connect the capacitor bank C into the AC network in response to a gating signal generated by the VAR generator control circuit, and an auxiliary thyristor switch $SW_a$ to connect a voltage clamping device $R_c$ in parallel with the main thyristor switch whenever the voltage across the main thyristor switch exceeds a predetermined level. The main thyristor switch, $SW_m$, is rated for the full load capacitor current and only for the normal peak operating voltage which is approximately twice the peak value of normal AC network voltage. The main and auxiliary thyristor switches are gated by suitable firing VAR generated control circuits such as those described in U.S. Pat. No. 4,307,331 incorporated herein by reference.

The auxiliary thyristor switch, $SW_a$, is rated only for the worst case transient capacitor discharge current and for a peak voltage which is normally less than that occurring across the main thyristor switch. As seen in FIG. 3, the voltage across the main thyristor switch appears across the series connected auxiliary thyristor switch $SW_a$ and the voltage clamping device $R_c$. The voltage clamping device $R_c$ is a zinc-oxide or similar type voltage surge arrestor with a volt/ampere characteristic such that below a specified voltage level, known as the clamping or breakover voltage, it exhibits a very high resistance where as above that level, it has a low resistance ideally approximating zero. In normal operation, both the auxiliary switch $SW_a$ and the clamping device $R_c$ represent essentially an open circuit with negligible current flow in them. Thus, in order to define the voltage across $SW_a$ and $R_c$ a relatively low current voltage dividing network consisting of a capacitor $C_d$ in series with a RC snubber circuit components $R_1$, $C_1$, through $R_n$, $C_n$ of the auxiliary thyristor switch circuit is employed as shown in FIG. 3. The RC snubber circuits are generally used in a thyristor switch to limit dv/dt and provide a proper voltage sharing for the individual thyristor devices. In the preferred embodiment, the breakover voltage of the clamping device equals approximately twice the normal peak AC network voltage and the RC voltage dividing network is so designed that the repetitive normal voltage across the clamping device does not exceed its rated value. Presently available zinc-oxide clamping devices can be stressed with a peak repetitive voltage of about half of the clamping voltage. Thus, in the preferred embodiment, the RC voltage dividing network would establish approximately equal voltage sharing between the auxiliary thyristor switch $SW_a$ and a clamping device $R_c$, that is, that each would be stressed by half of the voltage appearing across the main thyristor switch $SW_m$.

The firing circuit 29a of the auxiliary thyristor switch $SW_a$ is activated according to the voltage level across the main thyristor switch $SW_m$. As shown in FIG. 3, a voltage signal obtained from the dividing network, DVN, representing the voltage across the main thyristor switch is compared by comparator circuit CP against a fixed reference level provided by zener diodes ZN. If the voltage across the main thyristor switch exceeds this level, the auxiliary thyristor switch is fired by firing the individual thyristor devices, and the clamping device $R_c$ is connected in parallel with the main thyristor switch to limit its voltage by the discharging capacitor bank C.

Figure 4:
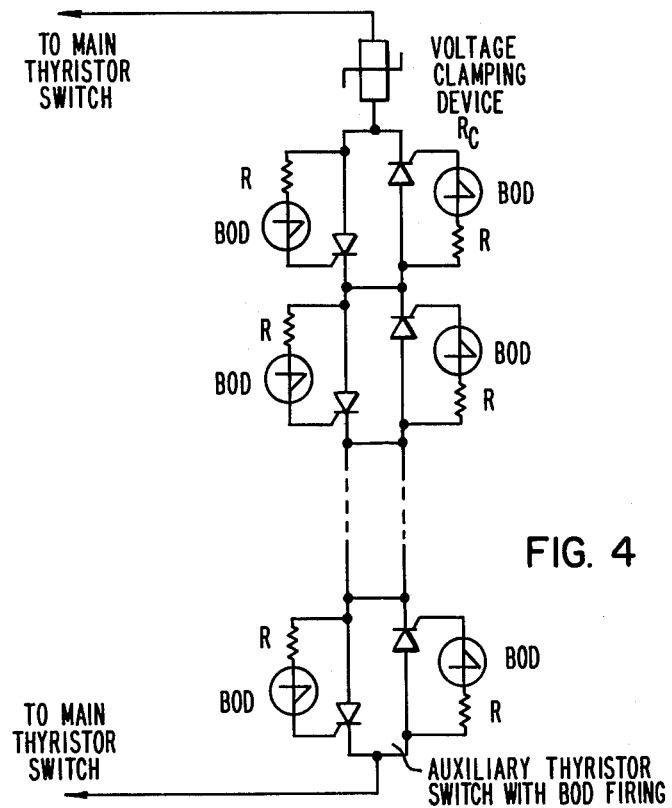
FIG. 4 illustrates an alternate embodiment of a thyristor switch circuit incorporating the principles of this invention.

FIG. 4 illustrates an alternate embodiment of this control circuit in which the voltage signal to fire the auxiliary thyristor switches is derived from its own blocking voltage since this voltage is directly proportional to the main thyristor switch voltage. Also, the firing circuit for the auxiliary thyristor switches could be realized by simply using breakover diodes (BOD). These diodes have the characteristics of changing their blocking state into conducting states whenever the voltage across them exceeds a predetermined value. Using the BOD devices to fire the thyristors in the auxiliary thyristor switch, it is necessary to coordinate the breakover voltage of the BOD devices so that their conduction would begin before the voltage across the auxiliary switch thyristors and the main switch thyristors exceed their rated values.

The basic idea in the proposed thyristor switch circuit arrangement is to use an auxiliary thyristor switch in conjunction with a voltage clamping device to limit the residual charge on the capacitor bank and thereby reduce significantly the voltage rating of the main thyristor switch that switches the capacitor bank in and out of the AC system network. The reduced voltage of the main thyristor switch allows the use of fewer thyristor devices in series, thus reducing losses and cooling requirements. Also, since the voltage reduction for the main thyristor switch is typically greater than the required voltage rating of the auxiliary thyristor switch, and the thyristor devices in the auxiliary switch can be of lower current rating without generally requiring forced cooling, the proposed thyristor switch circuit arrangement results in an overall lower cost than that of the prior art thyristor switch circuit arrangements.

Figure 5:
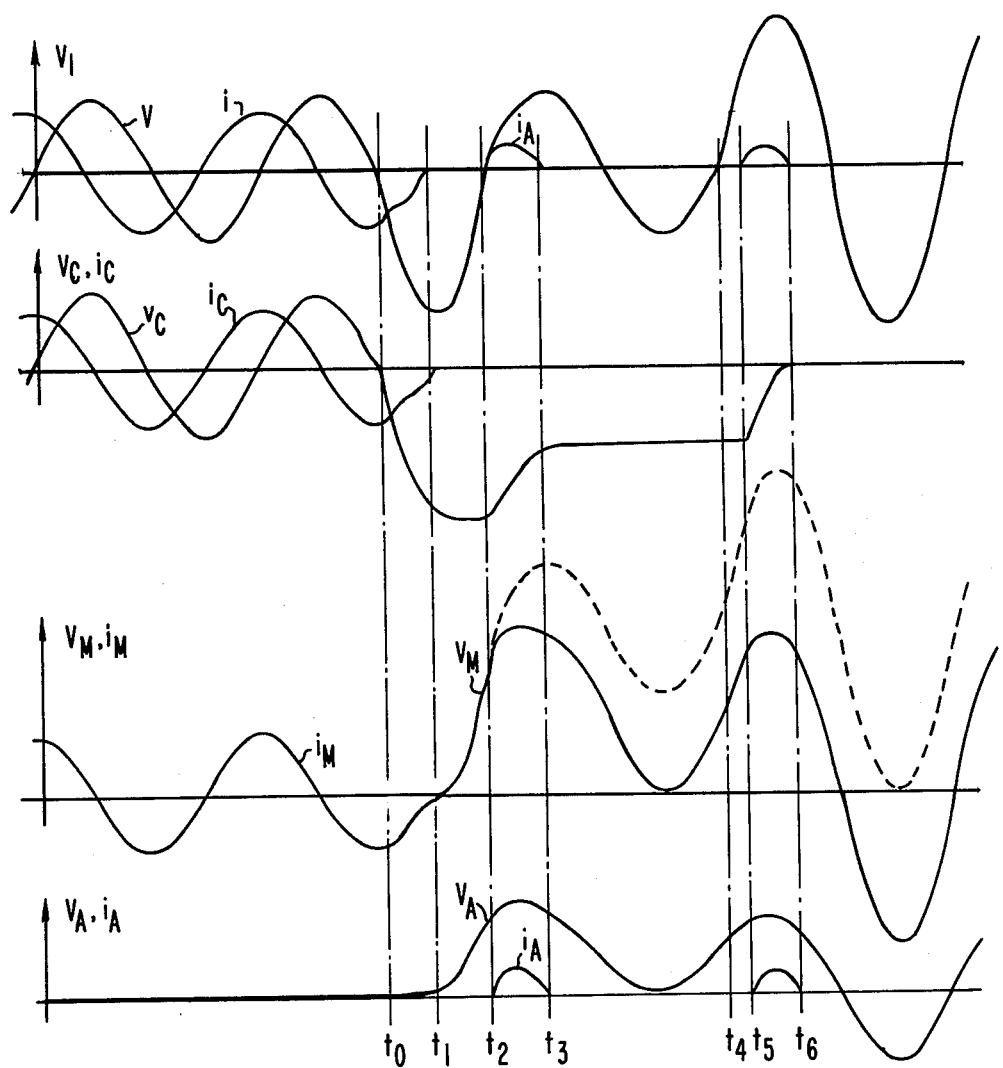
FIG. 5 illustrates waveforms and circuit characteristics of the thyristor switching circuit shown in FIG. 3.

The operation of the proposed thyristor switch circuit arrangement is illustrated by the waveforms in FIG. 5. As illustrated by the waveforms, the network voltage V is constant until the time instant $t_0$; and the capacitor bank C is switched in by the main thyristor switch $SW_m$. At the time $t_O$, the AC network voltage is increased for half of a cycle duration to about two per unit value (2 P.U.) because of presumed load switching or other transient disturbances in the AC network. The increased AC network voltage necessitates the reduction of the capacitive VARs supplied and the VAR generator control initiates the disconnection of the capacitor bank C by blocking the gate drive to the thyristors in the main thyristor switch $SW_m$. As a result, the main thyristor switch $SW_m$ turns off at the time instant $t_1$ when the capacitor current, $i_M$, through $SW_m$ crosses zero. At this time the capacitor voltage equals the peak value of the AC network voltage, which is in the present case 2 P.U. Since the capacitor is essentially disconnected from the AC network, its voltage only slowly decays due to losses or internal discharge resistors. From time $t_1$ the voltage $V_M$ across the main thyristor switch $SW_m$ begins to increase as the network voltage starts to change in the opposite direction. At the time instant $t_2$ the voltage $V_M$ across the main thyristor switch $SW_m$ increased to the point that the voltage signal obtained across attenuator resistor $R_1$ reaches the present level of the comparator which provides a turn-on signal to the firing circuit shown in FIG. 3. As a result, the auxiliary thyristor switch $SW_a$ is fired at time instant $t_2$, connecting the voltage clamping device $R_c$ across the main thyristor switch $SW_m$. The clamping device $R_c$ begins to conduct and maintains an essentially constant voltage across the main thyristor switch $SW_m$ as the AC network voltage V increases further in the opposite direction by reducing the residual charge of the capacitor bank C. The discharging of the capacitor bank C to a level at which the voltage across $SW_m$ stays below its rated value, which is somewhat higher than the clamping voltage level, is completed at the time instant $t_3$ when the discharge current through the clamping device $R_c$ and the auxiliary thyristor switch $SW_a$ decreases to zero. At this instant the auxiliary thyristor switch $SW_a$ turns off and the main thyristor switch supports normal operating voltage which in the preferred embodiment is about 2 P.U. From the time instant $t_3$ the capacitor bank C can be controlled as dictated by the VAR generator demand control.

To illustrate further the operation of the proposed thyristor switch arrangement, let it be asssumed that the main thyristor switch is kept switched off after the time instant $t_3$ because the AC network requires no capacitive compensation and a sustained overvoltage condition of approximately 2 P.U. is encountered in the AC network due to, for example, load rejection at a time instant $t_4$. When the voltage across the main thyristor switch $SW_m$ reaches approximately 2 P.U. value at time instant $t_5$, the auxiliary thyristor switch $SW_a$ is again fired and a voltage clamping device $R_c$ is connected across the main thyristor switch $SW_m$. This limits the voltage across $SW_m$ to a 2 P.U. value against the increasing AC network voltage as the capacitor bank C becomes fully discharged via the voltage clamping device $R_c$ and the auxiliary thyristor switch $SW_a$. The discharge of the capacitor bank is completed at time instant $t_6$ when the auxiliary thyristor switch turns off. Again, the voltage across the main thyristor switch $SW_m$ is limited to 2 P.U. which in the preferred embodiment is the normal rated voltage across $SW_m$.

It should be appreciated that the basic principle of using an auxiliary thyristor switch to limit the residual charge on the capacitor bank can be implemented in several different ways. In the preferred embodiment the main thyristor switch is rated for approximately 2 P.U. peak value of the AC voltage, the auxiliary thyristor switch one P.U. and the breakover voltage clamping device is 2 P.U. Several other voltage ratings for these components could be possible. For example, by reducing the breakover voltage level of the clamping device, the voltage rating of the main thyristor switch could be reduced below 2 P.U. at the expense of accepting the generation of some transients at the switching of the capacitor bank. Also, it should be clear that in the proposed thyristor switch circuit arrangement, the voltage clamping device could be substituted by resistor or other circuit elements of various volt ampere characteristics. In these cases, the voltage rating of the main and auxiliary thyristor switches, and the volt ampere characteristic of the circuit element used for the capacitor discharge should be properly coordinated.

Although there has been illustrated and described specific structure, it is to be clearly understood that the same were merely for purposes of illustration and that changes and modifications may readily be made therein by those skilled in the art without departing from the spirit and the scope of this invention.

I claim:

1. A static VAR generator, comprising:
   (a) a capacitance means disposed for connection into an AC network;
   (b) a monitoring means for monitoring the capacitive requirements of said AC network;
   (c) a control means having antiparallel connected thyristors for connection of said capacitance means into the AC network in response to the capacitive requirements of the AC network; and
   (d) an auxiliary control means having antiparallel thyristors to connect a zinc oxide variator means for discharging the capacitance means when the AC network is subject to high transient voltages.

2. A static VAR generator as recited in claim 1 wherein the auxiliary control means is further comprised of breakover diodes for firing the thyristors when the voltage across the breakover diodes exceeds a predetermined value.

* * * * *